UNITED STATES PATENT OFFICE.

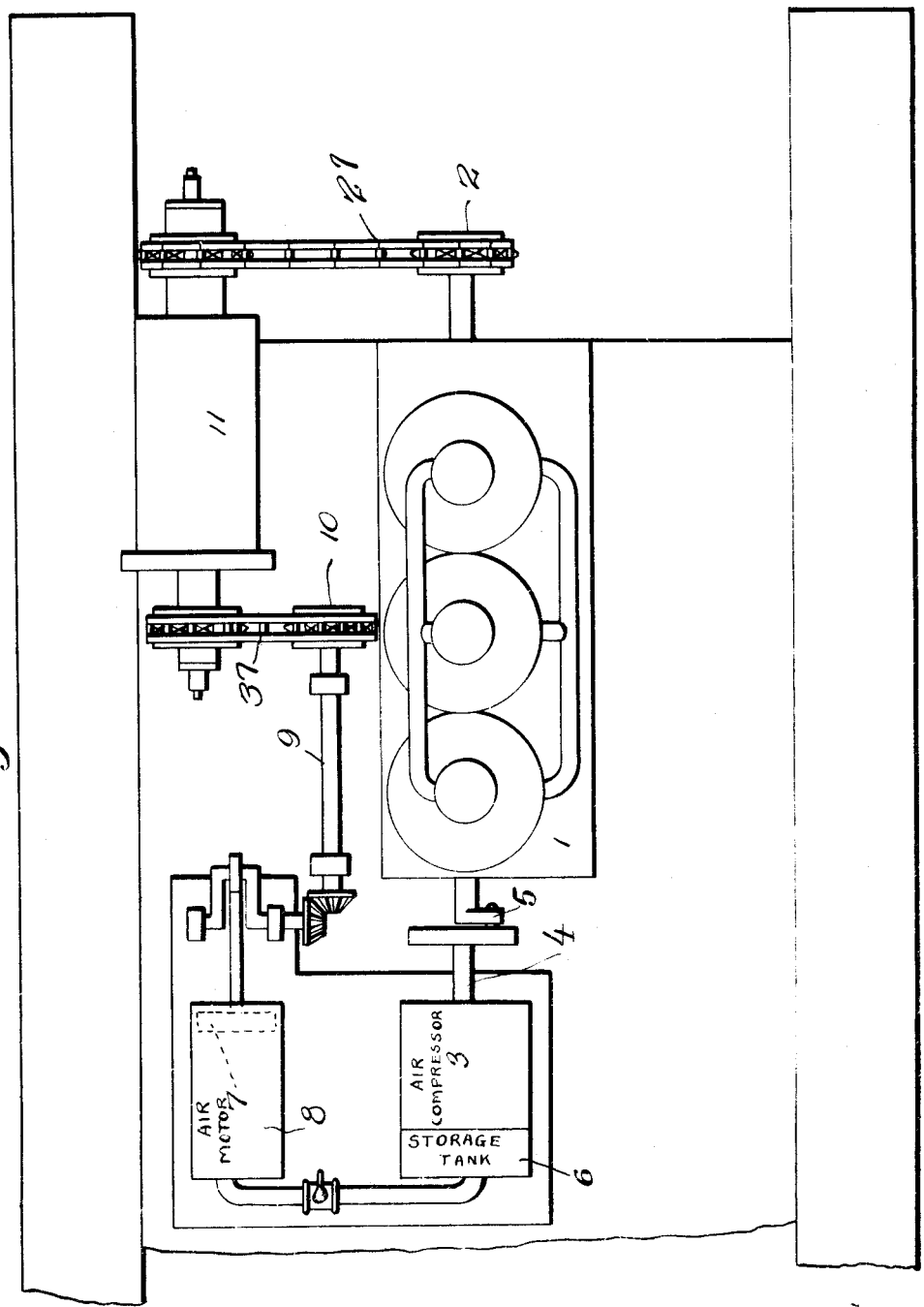

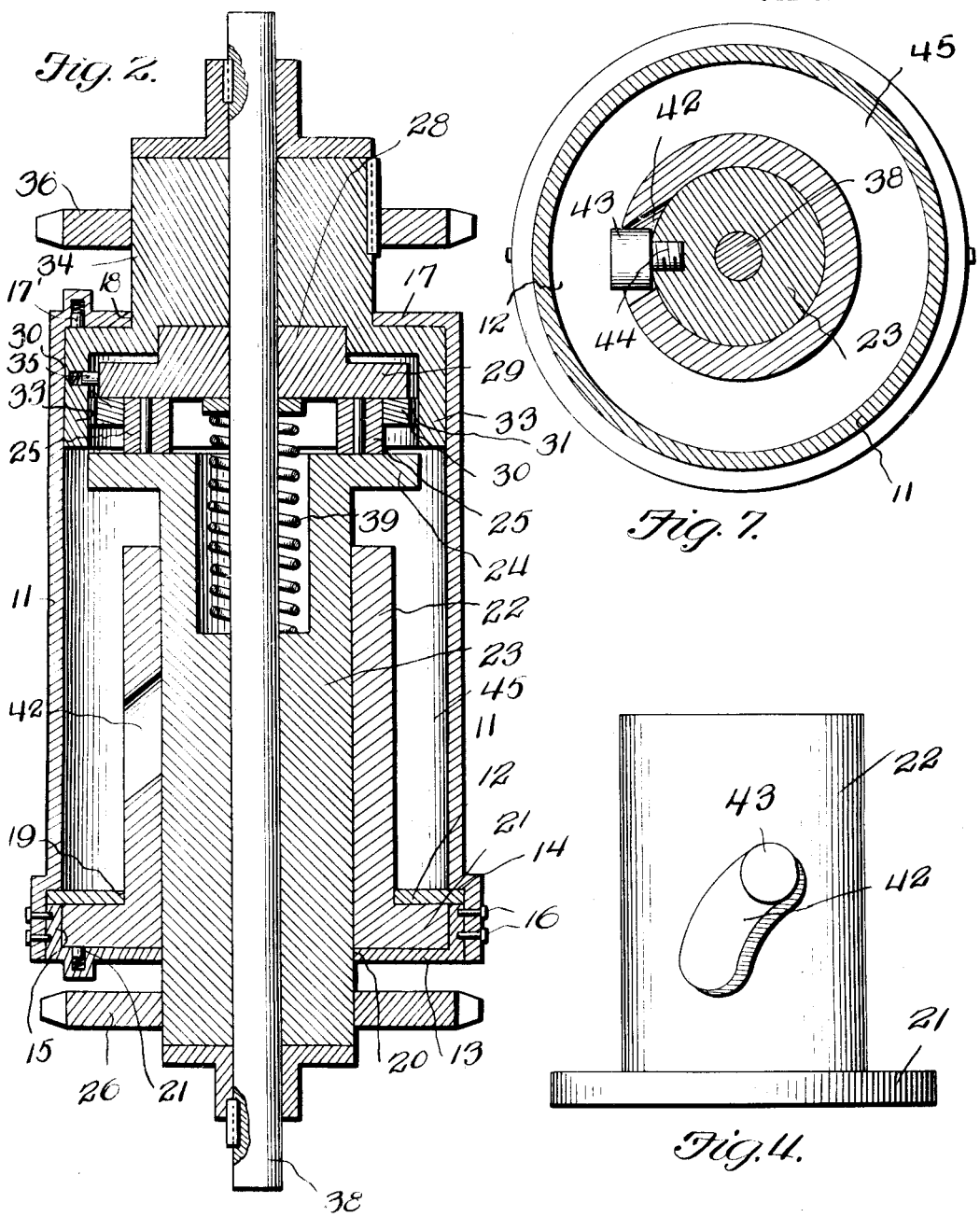

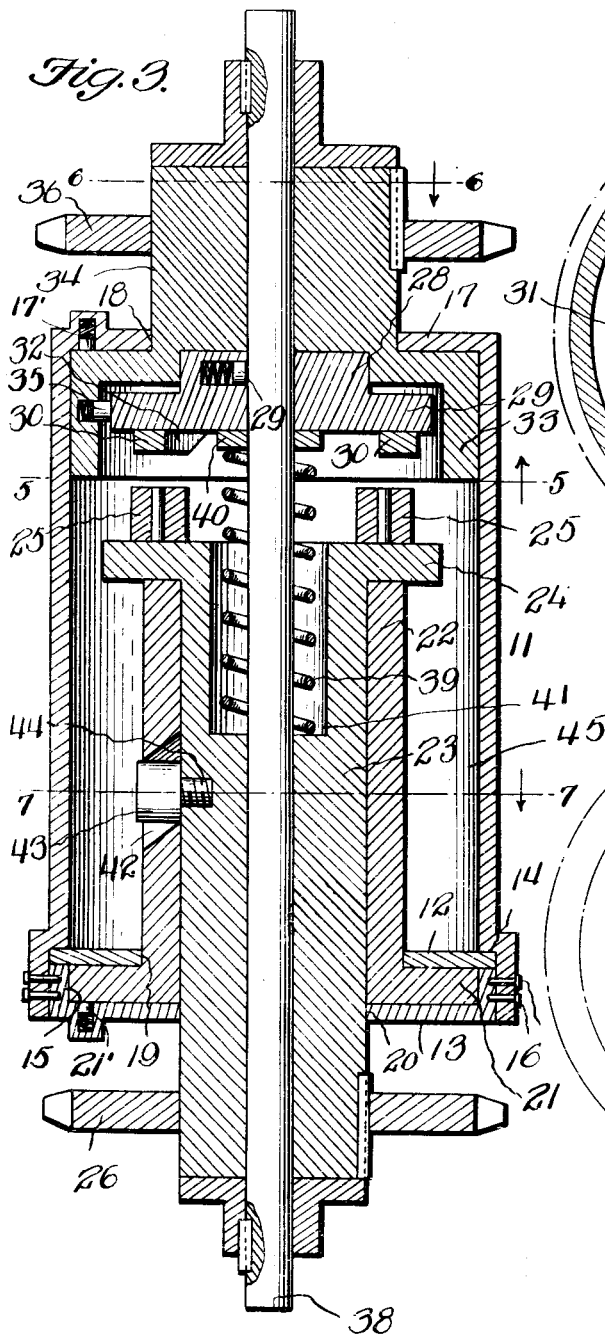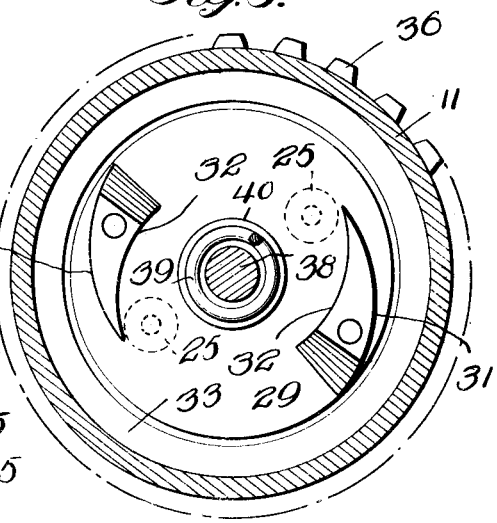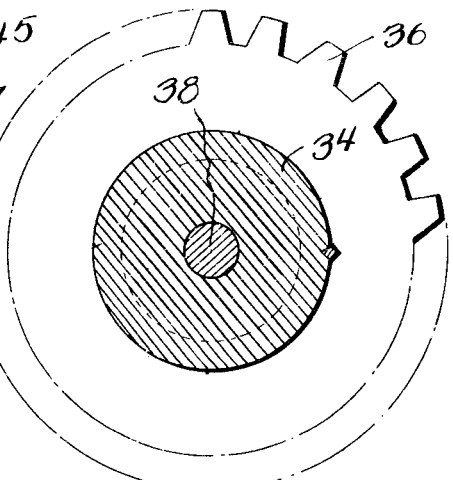

MORGAN W. HARTSOCK, OF SOUTH BEND, AND GUY STUTZMAN, OF MISHAWAKA, INDIANA.

MOTOR-STARTER.

1,049,084.     Specification of Letters Patent.     Patented Dec. 31, 1912.

Application filed April 1, 1910. Serial No. 552,893.

*To all whom it may concern:*

Be it known that we, MORGAN W. HARTSOCK and GUY STUTZMAN, citizens of the United States of America, residing at South Bend and Mishawaka, respectively, in the county of St. Joseph and State of Indiana, have invented new and useful Improvements in Motor-Starters, of which the following is a specification.

This invention relates to starters for motors and particularly to one designed especially for use in connection with motors of automobiles or like vehicles, and it has for an object to provide mechanism of this character comprising coöperating or companion elements which may be driven by any desired well known form of compressed air motor or the like and operable upon starting of such motor to transmit the required movement to the crank shaft of the motor of the vehicle.

Another object of the invention is to provide mechanism of the character set forth which is operable to automatically start the motor, obviating the necessity of cranking the same by hand, the said mechanism being constructed whereby it will be automatically thrown out of gear immediately after the initial starting of the engine and also immediately thrown out of operation should the engine kick or start backward as is common with all gasolene engines, thereby eliminating rupturing the elements of the mechanism and insuring such elements against becoming inoperative A still further object of the invention is to provide novel and effective means utilizing the power of the motor of the vehicle for establishing the desired fluid pressure in the storage tank of the compressed air motor which latter is used in connection with our improved motor starting mechanism.

In the drawings, forming a portion of this specification and in which like numerals of reference indicate similar parts in the several views:—Figure 1 is a top plan view of a portion of a motor vehicle showing the motor therefor and our improved starting mechanism and the compressed air motor for such mechanism. Fig. 2 is a vertical section through the starting mechanism showing the companion coöperating elements engaged with each other. Fig. 3 is a similar view showing the companion elements of the mechanism disengaged from each other. Fig. 4 is a side elevation of the movable clutch-actuating member. Fig. 5 is a horizontal section taken on the line 5—5 of Fig. 3 looking in the direction of the arrow. Fig. 6 is a horizontal section taken on the line 6—6 of Fig. 3. Fig. 7 is a horizontal section taken on the line 7—7 of Fig. 3.

The automobile illustrated in Fig. 1 of the drawings may be of any approved well known construction, and as illustrated, it is provided with a gasolene motor 1 on the crank shaft of which is mounted a sprocket gear 2 for a purpose to be hereinafter described. The vehicle supports a suitable rotary air compressor 3 whose piston shaft 4 is operated through a connection 5 on the crank shaft of the motor 1. It will of course be understood that we do not rely particularly upon the arrangement of the just described elements as it is obvious that any suitable mechanism may be employed for operating the compressed air motor. It may be described that the air compressor has communication with a storage tank 6 having a suitable valved connection with an air motor comprising, in the present instance, a piston 7 in the cylinder 8, the said piston being operatively connected with a driven shaft 9 on which is secured a sprocket gear 10.

Our improved starting mechanism for the gasolene motor 1 of the vehicle consists of a casing 11 which may be secured in any suitable obvious manner to any preferred part of the vehicle. This casing is provided at one end with companion head plates 12 and 13, the former being seated against the shoulder 14 of the casing and the latter seated against the plate 12 through the provision of an annular flange 15. This flange is secured to the casing by means of bolts or their equivalent fastening devices 16. The opposite end of the casing is formed to provide a head 17 in which is formed a central passage 18. The plate 12 is provided with a central passage 19 which is disposed in line with a similar passage 20 in the plate 13. Incident to the peculiar construction of the plate 13 it will be seen that it is disposed in spaced relation to the plate 12 and mounted between the said plates 12 and 13 is the circular flanged portion 21 of a clutch-actuating member 22 which extends longitudinally of the casing 11 and in spaced relation to the side walls of such casing. The clutch-actuating member 22 is hollow to receive the clutch member 23. This clutch member is provided at one end with a disk-forming portion 24 on which is mounted at diametrically opposite points a pair of rollers 25. The opposite end of the clutch member 23 extends through the passage 20 and the head plate 13 and keyed to this end of the said clutch member is a sprocket gear 26 which is geared to the sprocket gear 10 on the shaft 9 of the compressed air motor by a drive chain 37.

A clutch member 28 extends through the passage 18 in the head 17 of the hereinbefore described casing and within said casing the clutch member is formed to provide a disk 29 upon which is suitably mounted companion gripping shoes 30 which are provided with arcuate convexed outer surfaces 31 and concaved inner surfaces 32. The surfaces 32 are constructed whereby they may be engaged by the rollers 25 and the shoes on their pivots so as to cause their convexed surfaces 31 to be moved into frictional locking engagement with the circular wall 33 of a member 34. This member surrounds the clutch member 28 and it is secured thereto by a friction brake 35. A sprocket gear 36 is keyed to the member 34 and it is geared to the sprocket gear 2 on the crank shaft of the gasolene motor 1 by a drive chain 27.

A stationary bearing shaft 38 extends through the clutch members 23 and 28, and as shown, an extensile spring 39 surrounds a portion of the said shaft and it exerts its tension against the collar 40 of the shaft and the shoulder 41 of the clutch member 23 to hold the said member normally in the position shown in Fig. 2 of the drawings.

The clutch actuating member 22 has formed therein a cam slot 42 in which extends the roller 43 which is mounted to revolve on the stub shaft 44 which extends radially from the clutch member, as shown. It will of course be understood that any desired well known means may be employed for throwing the air compressor in or out of gear with the gasolene motor of the vehicle and it will also be understood that any desired controlling mechanism of suitable well known design can be employed for starting the air motor for the purpose of revolving the sprocket gear 10.

In operation of the improved starting mechanism described and shown herein, assuming it to be the desire of the operator to start the gasolene motor the compressed air motor is first operated by the air from the air compressor to impart to the shaft 9 the desired rotary movement. This movement, incident to the chain drive 37 between the sprocket gears 10 and 26, will impart rotary movement to the clutch member 23, and incident to the provision of the actuating member 22 the roller 43 of the just named clutch element will be moved into engagement with the walls of the cam slot 42 so as to move the clutch element longitudinally of the casing against the tension of the extensile spring 39. Movement of such clutch member will be toward the companion clutch member 28 and the rollers 25 will be moved into engagement with the shoes 30 to cause them to frictionally bind against the walls 33 of the member 34. The clutch members then rotate with each other and the desired rotary movement is imparted to the sprocket gear 36. In rotation of the just named gear the desired power will be transmitted to the crank shaft of the gasolene motor and when the speed of the motor is greater than the speed of the clutch elements the rollers 25 will be free to disengage the shoes 30 and under tension of the extensile spring 39 the coöperating clutch members will be moved relatively and into their disengaged positions.

Upon reference to Fig. 5 of the drawings it will be seen that movement of the rollers 25 which are shown diagrammatically will move toward the concavities or inner faces of the shoes in direction to move the shoes into frictional contact with the walls 33. Should the gasolene motor kick as is common in motors of this character the rollers 25 will be immediately moved out of contact with the shoes, incident to the reversed motion of the gasolene engine relative to the compressed air motor whereby the clutch member 23 will be caused to move out of engagement with its companion clutch member due to the roller 43 riding in the slot 42 of the actuating member 22, and the clutch elements will then be returned automatically to their initial positions. In this manner the parts are relieved of wear and we effectively obviate rupturing the parts which would tend otherwise to render the mechanism inoperative. The casing is formed to provide an oil chamber 45 which may be supplied with oil in any suitable well known manner so that the movable parts forming my improved mechanism can be thoroughly lubricated. A spring-controlled friction brake 21' is supported by the head 13 and it operates to bear against the flange 21 of the clutch-actuating member 22. A similar friction brake 17' is carried by the head 17 and it operates to bear against the part 33, as shown. The clutch member 29 is provided with a spring-controlled friction brake member 29' which bears against the bearing shaft, as illustrated. The purpose of the herein described friction brake members is to hold the respective elements of the structure in positions to provide for a positive engagement of the rollers 25 with the shoes 30 as will be understood.

We claim:—

1. In starting mechanism for explosive engines, an engine shaft, a motor, driven clutch members connecting the motor with the engine upon starting of the motor and operable after the initial starting of the engine to disconnect the same from the motor, said clutch members being mounted for movement relatively, movable shoes supported by one member, a co-engaging wall for the brake shoes, and means on the other clutch member operable to engage the shoes to move them into frictional engagement with the co-engaging wall.

2. In starting mechanism for explosive engines, a rotatable clutch member, brake shoes carried by the clutch member, an engine shaft connected with the said clutch member, a second rotatable clutch member mounted for sliding movement toward or away from the first named clutch member and provided with means operable to engage the shoes of the first named clutch member to move the shoes into frictional engagement with their co-engaging walls, a motor operatively connected with the second clutch member, and means operable upon starting of the motor to move the second named clutch member into engagement with the first named member so that power from the motor will be transmitted to the engine shaft.

3. In starting mechanism for explosive engines, a rotatable clutch member, brake shoes carried by the clutch member, an engine shaft connected with the said clutch member, a second rotatable clutch member mounted for sliding movement toward or away from the first named clutch member and provided with means operable to engage the shoes of the first named clutch member to move the shoes into frictional engagement with their co-engaging walls, a motor operatively connected with the second clutch member, a movable member having a cam slot, and a roller on the second clutch member operable to engage the walls of the slot to impart sliding movement to the second clutch member upon starting of the motor.

In testimony whereof we affix our signatures in presence of two witnesses.

MORGAN W. HARTSOCK.
GUY STUTZMAN.

Witnesses:
THOMAS O. McNEFF,
RAYMOND C. HALL.